United States Patent [19]

Revoyr

[11] Patent Number: 4,542,575

[45] Date of Patent: Sep. 24, 1985

[54] METHOD AND APPARATUS FOR INVERTING AN INJECTOR RAZOR BLADE

[76] Inventor: Dennis Revoyr, Rte. 3, Box 26, Mead, Wash. 98021

[21] Appl. No.: 543,946

[22] Filed: Oct. 20, 1983

[51] Int. Cl.[4] .......................... B65D 81/24; B23P 19/00; B25B 27/14

[52] U.S. Cl. .......................................... 29/426.2; 29/811; 29/426.3; 29/271; 29/278; 206/208; 206/228

[58] Field of Search ................ 206/208, 228, 582, 231; 29/278, 426.1, 426.2, 426.3, 271, 811

[56] References Cited

U.S. PATENT DOCUMENTS

| | | | |
|---|---|---|---|
| 1,817,512 | 8/1931 | Gaisman | 206/228 |
| 2,679,685 | 6/1954 | Austin | 206/228 X |
| 3,760,938 | 9/1973 | Ferrier, Jr. | 206/228 |

*Primary Examiner*—Howard N. Goldberg
*Assistant Examiner*—Vernon K. Rising
*Attorney, Agent, or Firm*—Seed and Berry

[57] ABSTRACT

A push key and blade-receiving cartridge are provided for removing, inverting and reinserting an injector blade into a razor. Preferred embodiments of the cartridge include pivotally mounted guides for separating the clamping members of a razor head and guiding the razor head into position with respect to the cartridge.

4 Claims, 7 Drawing Figures

METHOD AND APPARATUS FOR INVERTING AN INJECTOR RAZOR BLADE

DESCRIPTION

TECHNICAL FIELD

This invention relates to a device for ejecting and inserting blades from an injector-type razor, and more particularly, to such a device which is designed to enable an injector blade to be inverted and reinserted into a razor to extend the life of the blade.

BACKGROUND ART

Safety razors designed to use injector blades employ a head having top and bottom clamping members which sandwich a single-edged blade, thereby holding it in place with its cutting edge exposed for shaving. Injector blades are loaded into such razors using a loading cartridge. These loading cartridges have a separating arm which projects outwardly from the forward end of the cartridge into a slot in the rear of the razor head. When the separating arm is in the slot, it separates the clamping pieces and enables blades to be slid into and out of the razor head. A new blade is slid from the cartridge to a location between the clamping pieces. If an existing blade is mounted in the razor head, it will be pushed out of the head by the incoming blade. When a new blade is in place between the clamping members, the separating arm is removed from the slot to allow the clamping members to engage the blade and hold it in place.

While existing cartridges work well for loading new injector blades, they provide no means for reinserting a blade into the razor once it is removed. This limitation is undesirable in that it provides no means for the user of the razor to flip the blade over to invert the top and bottom of the cutting edge. Such inversion is desirable because it will prolong the useful life of the blade.

DISCLOSURE OF INVENTION

It is an object of this invention to provide a device which will enable an injector blade for razors to be inverted and reused in a razor.

It is another object of this invention to prolong the usable life of injector blades.

These and other object which will become more apparent as the invention is more fully described below and are obtained by providing a specially designed push key and blade-receiving cartridge which combine to enable the blade to be removed from a razor, rotated 180 degrees, and reinserted into the razor for additional use. The push key is used to slide razor blades from the razor head into the cartridge. The cartridge can then be rotated 180 degrees and the push key used to push the blade, now in an inverted position, from the receiver box back into the razor head.

In preferred embodiments, the cartridge includes a pair of guides which are pivotally mounted adjacent a razor head aperture in the cartridge for separating the clamping members of the razor head and guiding the razor head into the proper position for removal and reinsertion of blades.

BEST MODE FOR CARRYING OUT THE INVENTION

Figure 1:
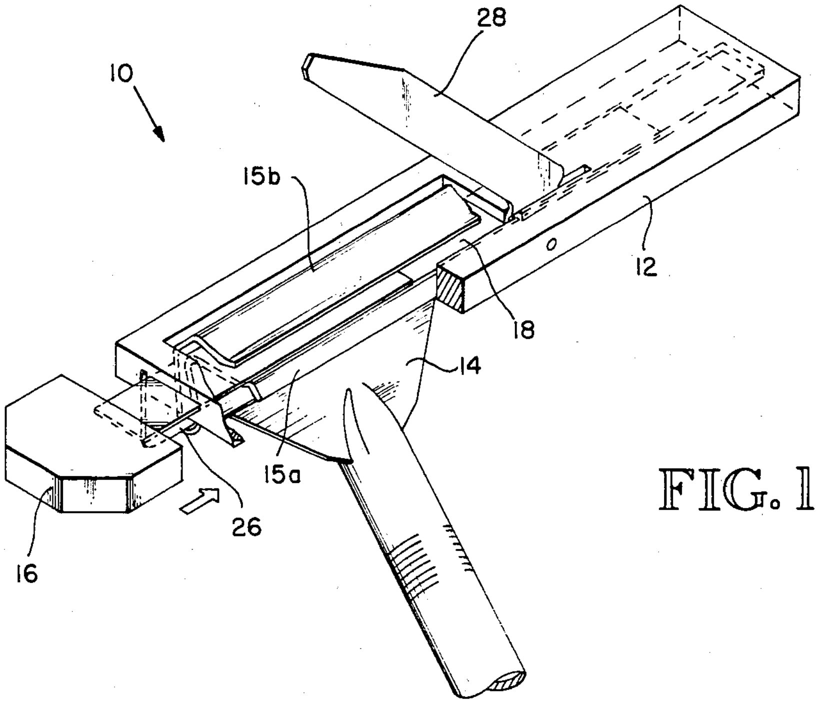
FIG. 1 is an isometric view of a preferred embodiment of the invention shown with a razor head place in the razor head aperture. The blade-receiving cartridge is cut away to illustrate the razor head.
Figure 2:
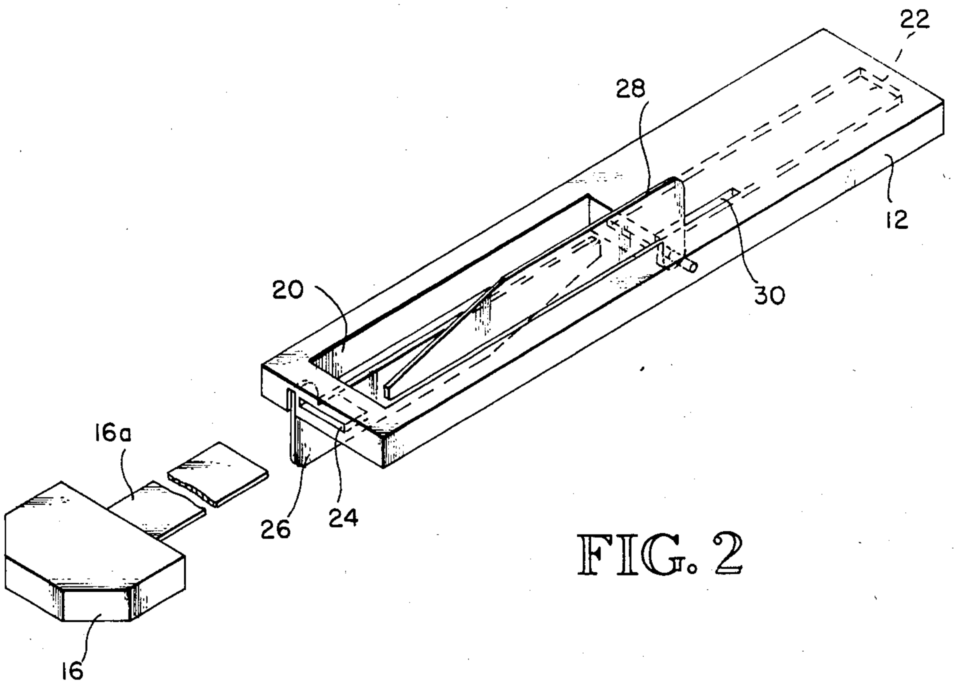
FIG. 2 is an isometric view of the embodiment of FIG. 1 without the razor head.

The invention can best be understood by referring to a preferred embodiment 10 illustrated in FIGS. 1 and 2. A blade-receiving cartridge 12 surrounds the head 14 of an injection razor. A push key 16 is used to slide a razor blade 18 out of the razor head and into the cartridge. Once the blade is in the cartridge, the cartridge is inverted with respect to the razor head and the push key is used to slide the blade, also inverted, out of the cartridge an back into the razor head for further use. The preferred embodiment described herein thus provides a quick and easy means to invert and injector blade and thereby prolong its useful life.

As best seen in FIG. 2, the cartridge includes an elongated razor head aperture 20 which houses the razor head during removal and reinsertion of a blade. The razor head aperture communicates at one end with an elongated blade slot 22 and at the other end with an end slot 24. The slots are aligned such that when the razor head is housed within the razor head aperture, the push key can be inserted into one slot to engage the blade and slide the blade into the other slot. During removal, the push key is inserted into the end slot and through the razor head to push the blade from the razor head into the blade slot. During reinsertion, the push key is inserted into the blade slot to push the blade out of the blade slot and back into the razor.

The cartridge includes a pair of guides 26, 28 which are used alternately to guide the razor head into the cartridge for removal or reinsertion of a blade. The guide also functions to separate the clasping members 15*a*, 15*b* of the razor head to allow a blade to slide therebetween in the same manner as the separating arm of a conventional loading cartridge.

As seen in FIG. 2, the guides are pivotally mounted to the cartridge adjacent opposite ends of the razor head aperture. As viewed in FIG. 2, a reinsertion guide 28 is mounted on top of the cartridge adjacent the blade slot 22. A removal guide 26 is mounted on the bottom side of the cartridge adjacent the end slot 24.

REMOVING THE BLADE

Figure 3:
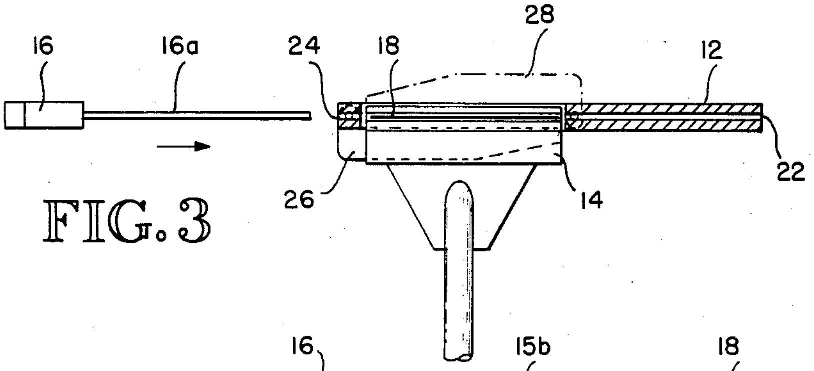
FIG. 3 is a front elevation view illustrating the position of the push key and cartridge prior to removal of the razor blade.
Figure 4:
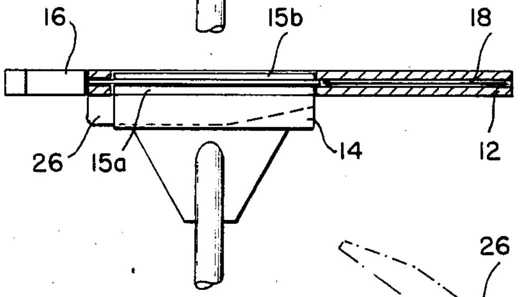
FIG. 4 is a front elevation view illustrating the position of the push key and cartridge after removal of the razor blade.

In operation, removal of a blade from a razor is preferably accomplished as follows. The removal guide is pivoted away from the razor head aperture. The razor head is then aligned with the distal end of the guide and the guide inserted into the razor head to separate the clasping members in a conventional manner. Once the guide has been completely inserted into the razor head, the clasping members are separated so that the blade is free to move within the razor head. The razor head is rotated toward the razor head aperture until the razor head is housed within the razor head aperture. The razor and cartridge are now in the "removal position" illustrated in FIG. 1 and shown schematically in FIG. 3. The blade is removed from the razor by sliding the push key 16 through the end slot 24 to engage the blade and pushing the push key through the end slot and razor head until the blade has been pushed completely out of the razor head and into the blade slot 18, as illustrated in FIG. 4. The push key is withdrawn from the cartridge and set aside until needed for reinsertion.

REINSERTION OF THE BLADE

Figure 5:
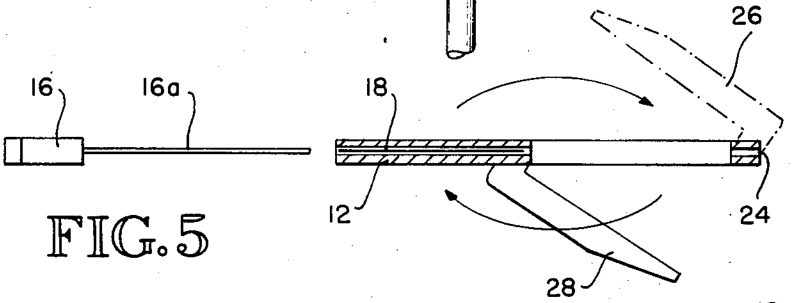
FIG. 5 is a front elevation view illustrating the rotation of the cartridge.
Figure 6:
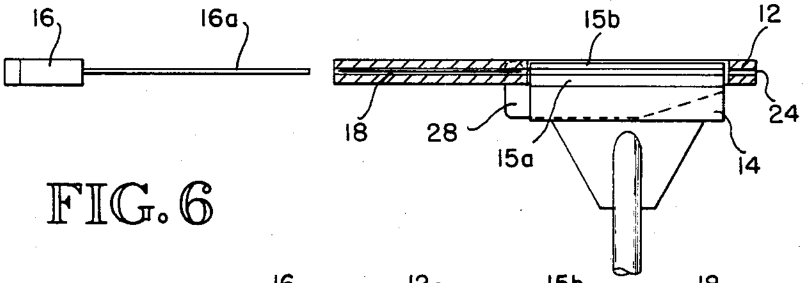
FIG. 6 is a front elevation view illustrating the position of the cartridge and push key prior to reinsertion of the inverted blade into the razor head.
Figure 7:
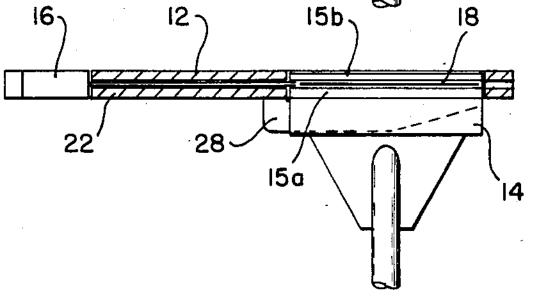
FIG. 7 is a front elevation view illustrating the position of the push key and cartridge when the inverted blade has been reinserted into the razor head.

The blade, once removed from the razor, is inverted with respect to the razor head and reinserted for further use. Once the blade is housed in the blade slot, the removal guide is pivoted away from the razor head aperture and the razor is disengaged from the removal guide. The cartridge is then rotated 180 degrees with respect to the razor head, as illustrated in FIG. 5, thereby inverting the blade with respect to the razor head. The reinsertion guide 28, now in the bottom side of the cartridge, is pivoted away from the razor head aperture and inserted into the razor head in the same manner as the removal guide. As illustrated in FIG. 2, the cartridge includes a cutaway portion 30 which provides a travel space for the reinsertion guide as it pivots away from the razor head aperture. Once the razor head is mounted on the reinsertion guide, the guide is pivoted toward the razor head aperture until the razor head is housed within the razor head aperture, as illustrated in FIG. 4. The razor head is now aligned to receive the inverted blade. The push key is inserted into the blade slot to engage the blade housed therein and push it between the clasping members 15*a*, 15*b* of the razor head. Once the inverted blade is in the razor head, the razor head and reinsertion guide are pivoted out of the razor head apature and the razor is disengaged from the guide. The razor, with inverted blade, is now ready for use.

While the invention is described and disclosed herein with respect to one particular embodiment, it is not intended that the invention be limited to such embodiment. Variations of the invention will be obvious to those of ordinary skill in the art. It is intended then that this invention include not only the embodiment disclosed herein but also all equivalent embodiments which are within the spirit of the invention.

I claim:

1. An apparatus for removing an injector blade held within a razor by clasping members and reinserting it into the razor in an inverted position for further use, which comprises:

a cartridge for receiving a blade and storing it prior to reinsertion, the cartridge including:

an elongated razor head aperture for receiving the head of an injector razor;

a blade slot extending from one end of the razor head aperture to the exterior of the cartridge, the blade slot sized to receive and contain an injector blade;

an end slot extending from the end of the razor head aperture opposite the blade slot to the exterior of the cartridge, the end slot and blade slot being aligned with one another;

first means for separating the clasping members and guiding the razor head into the razor head aperture so that a blade within the razor head will be aligned with the slots; and second means for separating the clasping members and guiding the razor head into the razor head aperture in a second blade-receiving position so that the razor head will be properly aligned to receive a blade from the blade slot; and a push key for sliding the blade out of the razor and into the blade slot and out of the blade slot and into the razor.

2. The apparatus of claim 1 wherein the first separating means comprises a guide member which is pivotally mounted to the cartridge adjacent the razor head aperture and end slot.

3. The apparatus of claim 1 wherein the second separating means comprises a guide member which is pivotally mounted to the cartridge adjacent the razor head aperture and blade slot.

4. A method of prolonging the useful life of an injector blade held within an injection razor by clasping members which comprises the steps of:

aligning the razor with a cartridge containing a blade slot;

separating the clasping members of the razor to release the blade such that it is free to move within the razor;

pushing the blade out of the razor and into the blade-receiving slot;

inverting the cartridge and blade stored in the blade-receiving cartridge with respect to the razor;

separating the clasping members to allow reinsertion of the blade; and pushing the blade from the blade-receiving slot into the razor.

* * * * *